United States Patent
Gowlla et al.

(10) Patent No.: US 12,373,448 B1
(45) Date of Patent: Jul. 29, 2025

(54) PREDICTING RELEVANCE OF RESOURCES TO SEARCH QUERIES

(71) Applicant: Capital One Services, LLC, McLean, VA (US)

(72) Inventors: Lavanya Gowlla, Bangalore (IN); Lavanya Raja, Bagalore (IN); Puneet Goyal, Bangalore (IN); Ajay Syamaladevi, Bangalore (IN); Vineet Kumar Jha, Bangalore (IN); Roshni Singh, Plano, TX (US); Uday Singh, Bangalore (IN); Shivansh Sethi, Bangalore (IN)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/773,566

(22) Filed: Jul. 15, 2024

(51) Int. Cl.
*G06F 16/2457* (2019.01)
*G06N 3/08* (2023.01)

(52) U.S. Cl.
CPC ......... *G06F 16/24578* (2019.01); *G06N 3/08* (2013.01)

(58) Field of Classification Search
CPC ........................... G06F 16/24578; G06N 3/08
See application file for complete search history.

(56) References Cited

U.S. PATENT DOCUMENTS

2023/0229692 A1* 7/2023 Goswami ................ G06F 16/24 707/723

* cited by examiner

*Primary Examiner* — Etienne P Leroux
(74) *Attorney, Agent, or Firm* — Foley & Lardner LLP

(57) ABSTRACT

Systems and methods for predicting relevance of resources to search queries. In some aspects, the system may receive a search query requesting resources from a database and may identify resources, including messages, relating to the search query. The system may extract, from the messages, hyperlinks specifying locations within the database. The system may input, into a model, the search query and the hyperlinks to cause the model to generate predictions of relevance of the hyperlinks to the search query. The system may then determine an overall relevance score for the resources in relation to the search query based on the predictions of relevance.

20 Claims, 7 Drawing Sheets

400

500

700

```
┌─────────────────────────────────────────────────────────────┐
│  Receive training hyperlinks specifying locations within a  │
│                         database                            │
│                           702                               │
└─────────────────────────────────────────────────────────────┘
                              │
                              ▼
┌─────────────────────────────────────────────────────────────┐
│  Input the training hyperlinks into a model to train the    │
│  model to predict relevance of the training hyperlinks to   │
│                     training queries                        │
│                           704                               │
└─────────────────────────────────────────────────────────────┘
                              │
                              ▼
┌─────────────────────────────────────────────────────────────┐
│   Receive a search query requesting resources from the      │
│                         database                            │
│                           706                               │
└─────────────────────────────────────────────────────────────┘
                              │
                              ▼
┌─────────────────────────────────────────────────────────────┐
│         Identify resources relating to the search query     │
│                           708                               │
└─────────────────────────────────────────────────────────────┘
                              │
                              ▼
┌─────────────────────────────────────────────────────────────┐
│   Extract hyperlinks specifying locations within the        │
│                         database                            │
│                           710                               │
└─────────────────────────────────────────────────────────────┘
                              │
                              ▼
┌─────────────────────────────────────────────────────────────┐
│  Input the search query and the hyperlinks into the model   │
│  to cause the model to generate predictions of the          │
│  relevance of the hyperlinks to the search query            │
│                           712                               │
└─────────────────────────────────────────────────────────────┘
                              │
                              ▼
┌─────────────────────────────────────────────────────────────┐
│  Determine an overall relevance score for the resources in  │
│  relation to the search query based on the predictions of   │
│  relevance                                                  │
│                           714                               │
└─────────────────────────────────────────────────────────────┘
```

FIG. 7

PREDICTING RELEVANCE OF RESOURCES TO SEARCH QUERIES

SUMMARY

Users may request resources from a database by inputting a search query into a search system. The search system may return resources that are relevant to the search query. Messages previously exchanged (e.g., on a messaging platform) and stored in the database may provide relevant resources. For example, messages may include hyperlinks to other locations within the database. Furthermore, the contents of the message may provide useful context for the hyperlinks and the linked locations. However, it may be difficult to tell which hyperlinks are relevant to a search query. A hyperlink to a video conference call that already occurred may not be relevant to a user search query, whereas a hyperlink to a PDF document may be relevant. Thus, a mechanism is desired for predicting relevance of resources to search queries.

Methods and systems are described herein for predicting relevance of resources to search queries. A relevance prediction system may be built and configured to perform the operations discussed herein. The relevance prediction system may receive, from a user, a search query requesting resources from a database. For example, a user may submit a question that may be resolved by accessing various resources within the database. The relevance prediction system may identify, within the database, resources relating to the search query. For example, the relevance prediction system may identify messages previously exchanged on a messaging platform that have been stored in the database. The relevance prediction system may extract, from the messages, hyperlinks to other locations within the database. The relevance prediction system may then input, into a machine learning model, the search query and the hyperlinks. This may cause the machine learning model to generate predictions of relevance of the hyperlinks to the search query. For example, the machine learning model may be trained to predict the relevance of hyperlinks to queries. The relevance prediction system may determine an overall relevance score for the resources in relation to the search query based on the predictions of relevance. In some embodiments, the relevance prediction system may rely on other factors as well, such as context within the text of the messages, sentiment analysis, or other factors. In some embodiments, the relevance prediction system may output the resources if the overall relevance score satisfies a relevance threshold. For example, the relevance prediction system may output resources that are deemed sufficiently relevant to the search query.

In some embodiments, the relevance prediction system may receive, from a user, a search query requesting resources from a database. For example, the resources may be documents, web pages, files, messages, or other resources. For example, a user may submit a question that may be resolved by accessing various resources within the database. In some embodiments, certain resources identified by the search system may be more useful, beneficial, conclusive, or otherwise relevant to the user's search query than other resources.

The relevance prediction system may identify, within the database, resources relating to the search query. For example, the relevance prediction system may identify messages previously exchanged on a messaging platform that have been stored in the database. The relevance prediction system may extract hyperlinks (e.g., linking to other locations within the database) from the messages. The hyperlinks may link to various types of locations, such as documents, web pages, files, downloads, platforms, or other types of locations.

In some embodiments, certain types of locations may be more relevant to a user query than others. The relevance prediction system may use a machine learning model to predict a relevance of messages retrieved from the database based on the type of location the message hyperlinks point to. For example, the relevance prediction system may input, into a machine learning model, the search query and the hyperlinks. This may cause the machine learning model to generate predictions of relevance of the hyperlinks to the search query. For example, the machine learning model may be trained to predict the relevance of hyperlinks to queries.

The relevance prediction system may determine an overall relevance score for the resources in relation to the search query based on the predictions of relevance. In some embodiments, the relevance prediction system may rely on other factors as well, such as context within the text of the messages, sentiment analysis, or other factors. In some embodiments, the relevance prediction system may output the resources if the overall relevance score satisfies a relevance threshold. For example, the relevance prediction system may output resources that are deemed sufficiently relevant to the search query.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 7 shows a flowchart of the process for predicting relevance of resources to search queries, in accordance with one or more embodiments.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
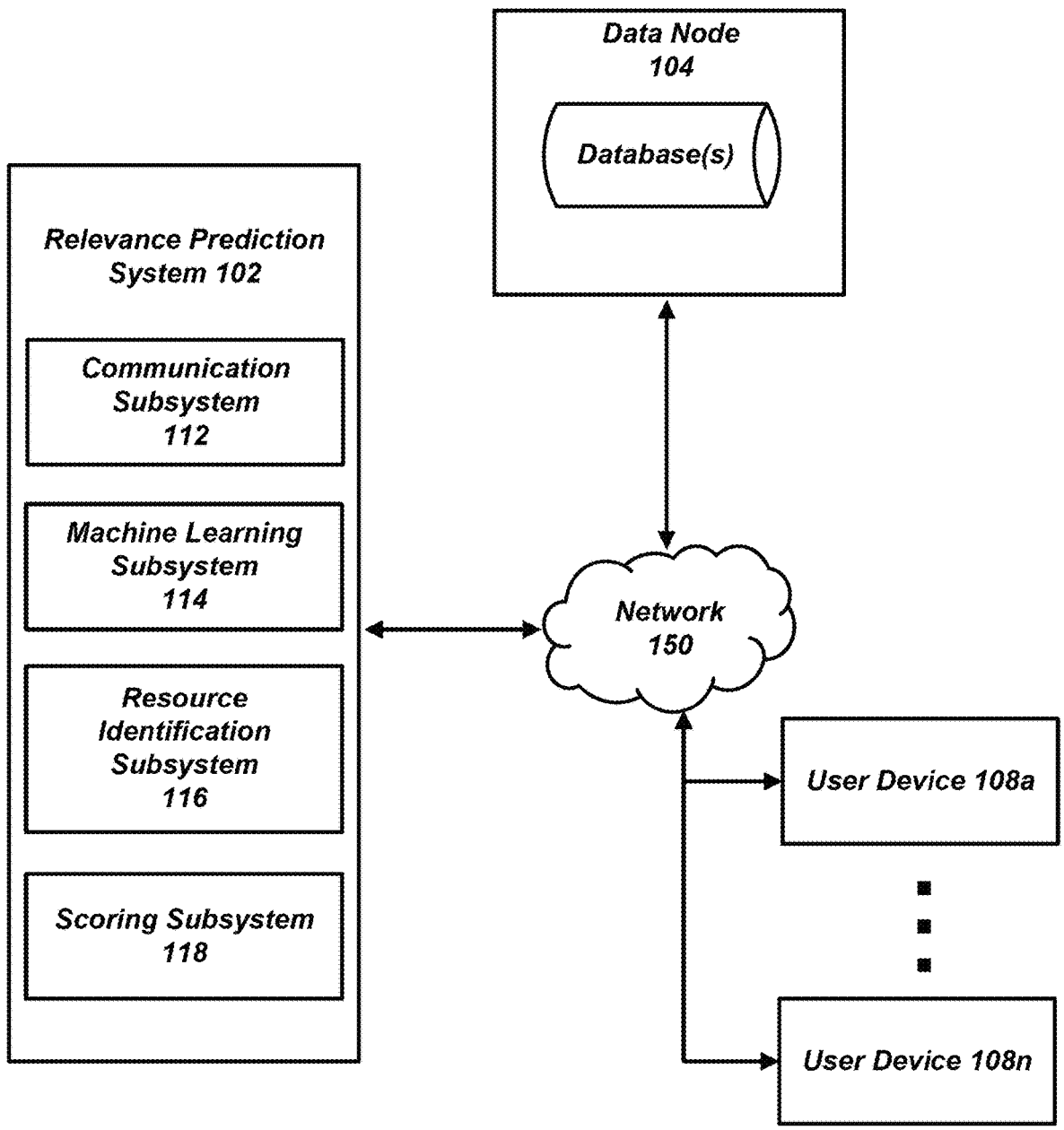
FIG. 1 shows an illustrative system for predicting relevance of resources to search queries, in accordance with one or more embodiments.

FIG. 1 shows an illustrative system 100 for predicting relevance of resources to search queries, in accordance with one or more embodiments. System 100 may include relevance prediction system 102, data node 104, and user devices 108a-108n. Relevance prediction system 102 may include communication subsystem 112, machine learning subsystem 114, resource identification subsystem 116, scoring subsystem 118, and/or other subsystems. In some embodiments, only one user device may be used, while in other embodiments, multiple user devices may be used. The user devices 108a-108n may be associated with one or more users or one or more user accounts. In some embodiments, user devices 108a-108n may be computing devices that may receive and send data via network 150. User devices 108a-108n may be end-user computing devices (e.g., desktop computers, laptops, electronic tablets, smartphones, and/or other computing devices used by end users). User devices 108a-108n may (e.g., via a graphical user interface) run applications, output communications, receive inputs, or perform other actions.

Relevance prediction system 102 may execute instructions for protecting client data from malicious actors while training machine learning models. Relevance prediction system 102 may include software, hardware, or a combination of the two. For example, communication subsystem 112 may include a network card (e.g., a wireless network card and/or a wired network card) that is associated with software to drive the card. In some embodiments, relevance prediction system 102 may be a physical server or a virtual server that is running on a physical computer system. In some embodiments, relevance prediction system 102 may be configured on a user device (e.g., a laptop computer, a smartphone, a desktop computer, an electronic tablet, or another suitable user device).

Data node 104 may store various data, including one or more machine learning models, training data, communications, and/or other suitable data. In some embodiments, data node 104 may also be used to train machine learning models. Data node 104 may include software, hardware, or a combination of the two. For example, data node 104 may be a physical server or a virtual server that is running on a physical computer system. In some embodiments, relevance prediction system 102 and data node 104 may reside on the same hardware and/or the same virtual server/computing device. Network 150 may be a local area network (LAN), a wide area network (WAN) (e.g., the Internet), or a combination of the two.

Relevance prediction system 102 (e.g., machine learning subsystem 114) may include or manage one or more machine learning models. Machine learning subsystem 114 may include software components, hardware components, or a combination of both. For example, machine learning subsystem 114 may include software components (e.g., application programming interface (API) calls) that access one or more machine learning models. Machine learning subsystem 114 may access training data, for example, in memory. In some embodiments, machine learning subsystem 114 may access the training data on data node 104 or on user devices 108a-108n. In some embodiments, the training data may include entries with corresponding features and corresponding output labels for the entries. In some embodiments, machine learning subsystem 114 may access one or more machine learning models. For example, machine learning subsystem 114 may access the machine learning models on data node 104 or on user devices 108a-108n.

Figure 2:
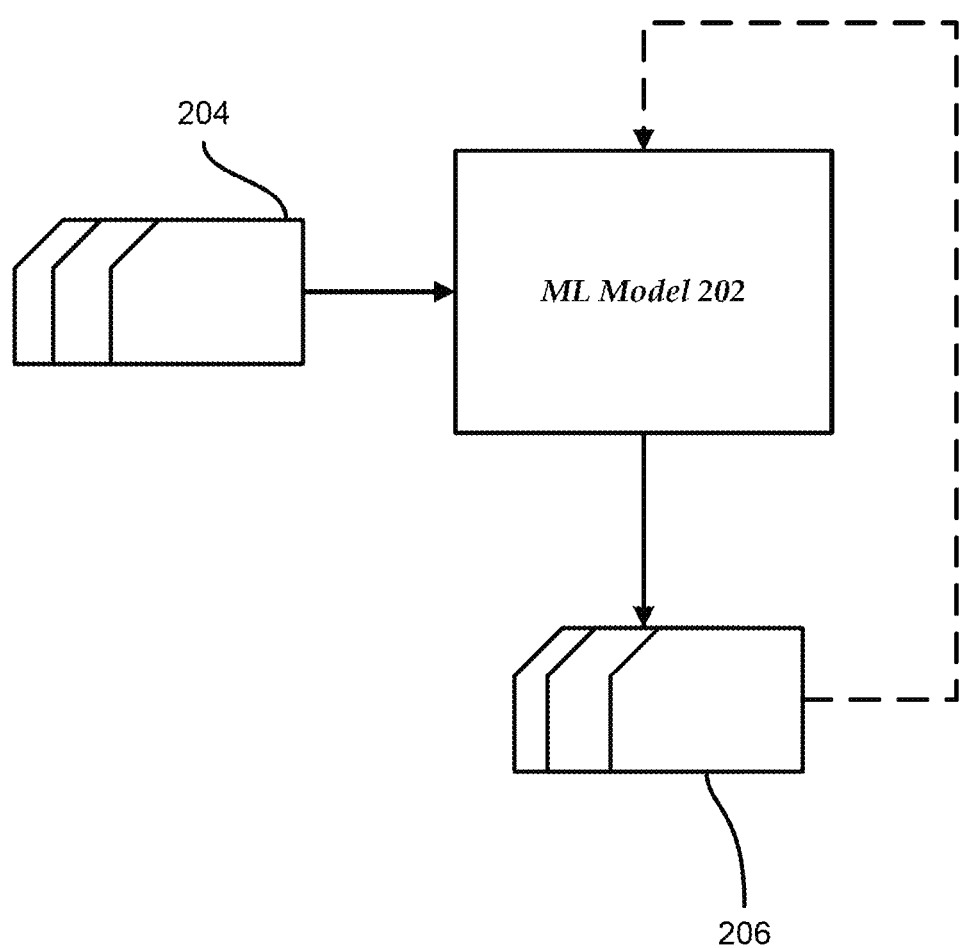
FIG. 2 illustrates an exemplary machine learning model, in accordance with one or more embodiments.

FIG. 2 illustrates an exemplary machine learning model 202, in accordance with one or more embodiments. In some embodiments, machine learning model 202 may be included in machine learning subsystem 114 or may be associated with machine learning subsystem 114. As an example, machine learning model 202 may represent a co-referencing model, an NLP model, or another type of model. Machine learning model 202 may take input 204 and may generate outputs 206. The output parameters may be fed back to the machine learning model as inputs to train the machine learning model (e.g., alone or in conjunction with user indications of the accuracy of outputs, labels associated with the inputs, or other reference feedback information). The machine learning model may update its configurations (e.g., weights, biases, or other parameters) based on the assessment of its prediction (e.g., of an information source) and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function, which combines the values of all of its inputs together. Each connection (or the neural unit itself) may have a threshold function that a signal must surpass before it propagates to other neural units. The machine learning model may be self-learning and/or trained, rather than explicitly programmed, and may perform significantly better in certain areas of problem-solving as compared to computer programs that do not use machine learning. During training, an output layer of the machine learning model may correspond to a classification of the machine learning model, and an input known to correspond to that classification may be input into an input layer of the machine learning model during training. During testing, an input without a known classification may be input into the input layer, and a determined classification may be output.

In some embodiments, relevance prediction system 102 may predict the relevance of resources to search queries entered into a search system. A search system may include an indexing mechanism, which may process and organize data in a way that speeds up query responses. This indexing may involve creating a searchable list of keywords, modules, and fields. The search system may also support filtering, sorting, and highlighting of certain search results. The user interface may allow users to input queries. This interface may enable auto-complete suggestions and the ability to handle natural language queries. The search engine may use one or more machine learning models to parse and understand the user's query, match it against the indexed data, and rank the results based on relevance. This may involve natural language processing techniques to deduce intent and context or machine learning models that improve search accuracy and personalization over time. The system may include a feedback mechanism to refine search results based on user interaction and preferences. Additionally, the system may select search results based on permissions associated with a user inputting the search query. The search system may generate a response to the search query that includes one or more resources. For example, the resources may be documents, web pages, files, messages, or other resources. In some embodiments, the resources may include hyperlinks to other locations within a database. In some embodiments, certain resources identified by the search system may be more useful, beneficial, conclusive, or otherwise relevant to the user's search query than other resources. Relevance prediction system 102 may predict the relevance of resources to search queries.

Returning to FIG. 1, relevance prediction system 102 (e.g., communication subsystem 112) may retrieve training hyperlinks. In some embodiments, the training hyperlinks may specify locations within a database. In some embodiments, the training hyperlinks may be interactive connectors between different web pages or locations within the database. They may be represented as clickable text or images, highlighted or underlined to distinguish them from regular text. When a user clicks on a hyperlink, it may trigger a request to retrieve and display a specific page or resource. For example, the hyperlink may point to a precise location within a database. In some embodiments, communication subsystem 112 may retrieve the training hyperlinks from messages stored within a database. In some embodiments, communication subsystem 112 may access previous messages received from users (e.g., on a messaging platform) that have been stored within the database or training messages stored within the database. The training hyperlinks may be included within certain messages.

Figure 3:
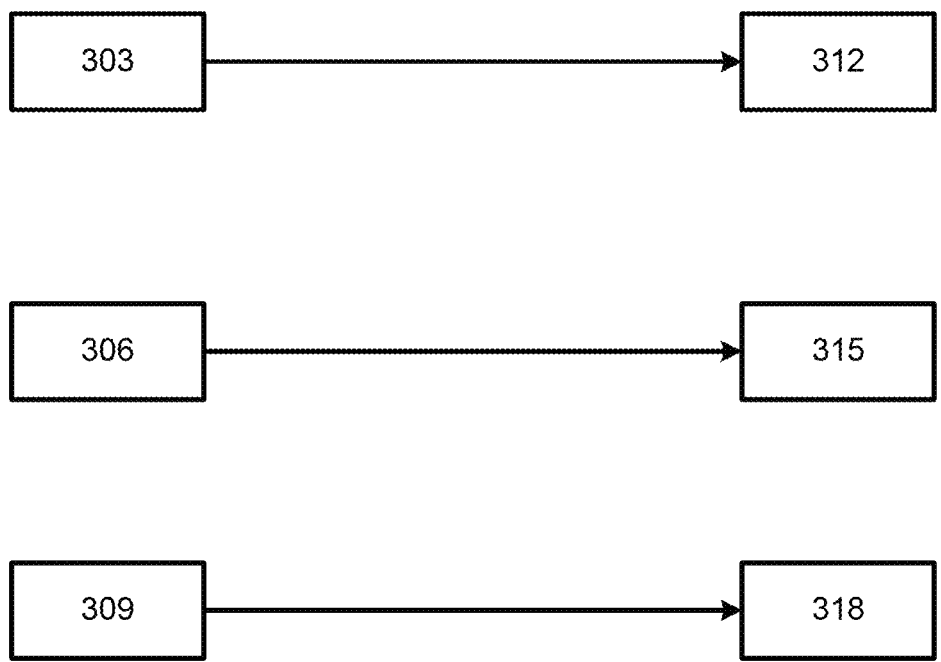
FIG. 3 illustrates training hyperlinks pointing to locations, in accordance with one or more embodiments.

FIG. 3 illustrates training hyperlinks 300 pointing to locations, in accordance with one or more embodiments. In some embodiments, training hyperlinks 300 may include training hyperlink 303, training hyperlink 306, and training hyperlink 309. In some embodiments, training hyperlinks 300 may represent a subset of the training hyperlinks retrieved by communication subsystem 112. Each training hyperlink may point to a location. For example, training hyperlink 303 may point to location 312, training hyperlink 306 may point to location 315, and training hyperlink 309 may point to location 318. Training hyperlinks 300 may direct users to downloadable files, such as PDF documents, images, or software applications. Each location may be a web page, for example, within the same database or on a different domain. Additionally, training hyperlinks 300 may lead to specific locations within a web page, such as a particular section or anchor point. In more interactive settings, training hyperlinks 300 may trigger actions like opening an email, starting a video, or initiating a file download. Thus, each of location 312, location 315, and location 318 may represent a variety of locations, files, or downloads.

In some embodiments, machine learning subsystem 114 may input the training hyperlinks and one or more training queries into a machine learning model (e.g., machine learning model 202, as shown in FIG. 2). For example, the training queries may be queries previously submitted to a search system for the database. In some embodiments, inputting the training hyperlinks and training queries into the machine learning model may train the machine learning model to predict the relevance of the training hyperlinks to the training queries. In some embodiments, machine learning subsystem 114 may use supervised learning to train the machine learning model. For example, the training hyperlinks may be labeled with relevance labels or relevance scores that indicate their relevance to each training query. The labels may be used as feedback for the model's predictions. In some embodiments, machine learning subsystem 114 may use unsupervised learning or other methods of training the machine learning model.

In some embodiments, machine learning subsystem 114 may train the machine learning model to predict the relevance of the training hyperlinks to the training queries based on types of locations specified by the training hyperlinks. For example, as discussed above, the training hyperlinks may each point to a web page, a file, a download, or another location. In some embodiments, different types of hyperlinks may generally be less relevant to search queries than others. For example, a first training hyperlink may specify a first type of location (e.g., a link to a videoconference platform) that has a lower relevance than a second training hyperlink specifying a second type of location (e.g., a link to a document viewing platform). Machine learning subsystem 114 may thus train the machine learning model to predict relevance based on types of locations specified by the training hyperlinks.

In some embodiments, communication subsystem 112 may receive, from a user, a search query requesting resources from the database. In some embodiments, the request may specify a type of resource or may request resources relating to a specific topic or question. Relevance prediction system 102 (e.g., resource identification subsystem 116) may identify, within the database, resources relating to the search query. For example, resource identification subsystem 116 may include the search system previously discussed. In some embodiments, resource identification subsystem 116 may identify resources that include one or more messages. For example, previous messages received by the system may be stored in the database and may be searchable by resource identification subsystem 116. One or more messages may be identified by the system as resources relating to the search query. For example, one or more keywords, sentiments, topics, or other elements of the messages may relate to the search query.

Figure 4:
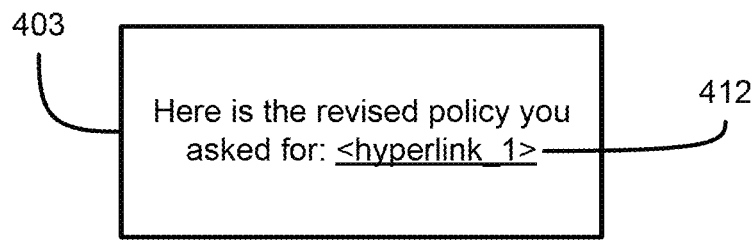
FIG. 4 illustrates messages including hyperlinks, in accordance with one or more embodiments.
Figure 4:
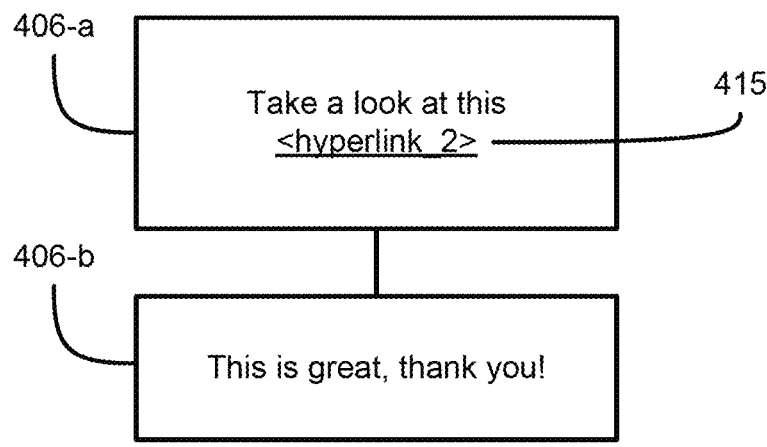
Figure 4:
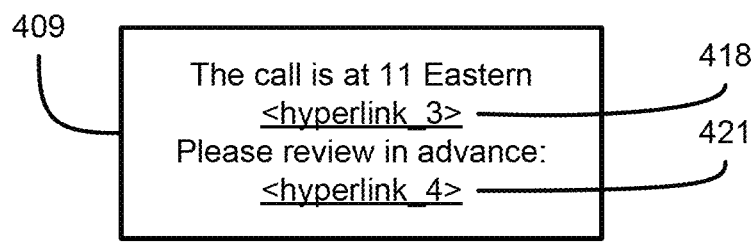

FIG. 4 illustrates messages 400 including hyperlinks, in accordance with one or more embodiments. For example, messages 400 may be previous messages from users that are stored in the database. In some embodiments, resource identification subsystem 116 may identify messages 400 as relating to a particular search query. For example, the query may be, "Who do I contact about reimbursements from my travel insurance policy while out of the country?" and resource identification subsystem 116 may identify message 403, message 406-*a* and message 406-*b*, and message 409 as relating to the query. For example, the messages may relate to the search query due to keywords, categories, metadata, hyperlinked data, or other information in each message. For example, message 403 may relate to the query because hyperlink 412 may include "travel_insurane_policy.docx" in the text of the hyperlink. In some embodiments, message 406-*a* may relate to the query because hyperlink 415 connects to a web page explaining key terms of various insurance policies. In some embodiments, message 406-*b* may be a reply to message 406-*a*. Message 409 may relate to the query because hyperlink 421 includes a memo about travel insurance policies. Message 409 may also include hyperlink 418.

In some embodiments, resource identification subsystem 116 may extract, from the one or more messages, hyperlinks specifying locations within the database. For example, as shown in FIG. 4, messages 400 may include hyperlink 412, hyperlink 415, hyperlink 418, and hyperlink 421. Resource identification subsystem 116 may extract the hyperlinks from the respective messages. Extracting the hyperlinks may involve parsing the text of each message to identify and isolate URL (uniform resource locator) patterns. This process may scan messages for strings that match a standard structure of a URL, such as those beginning with "http://" or "https://". Parsing techniques may also detect URLs embedded within different parts of the text, such as in parentheses or following certain keywords. Once identified, these hyperlinks may be extracted and stored separately.

Figure 5:
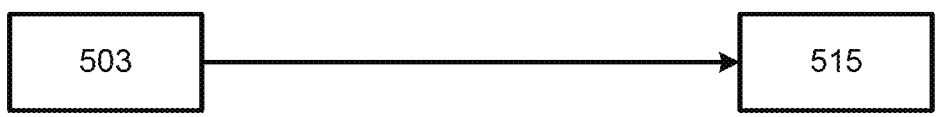
FIG. 5 illustrates hyperlinks pointing to locations, in accordance with one or more embodiments.
Figure 5:
Figure 5:
Figure 5:

FIG. 5 illustrates hyperlinks 500 pointing to locations, in accordance with one or more embodiments. Hyperlinks 500 may include hyperlink 503, hyperlink 506, hyperlink 509, and hyperlink 512. In some embodiments, hyperlinks 500 may represent the hyperlinks extracted from messages 400. For example, hyperlink 503 may correspond to hyperlink 412, hyperlink 506 may correspond to hyperlink 415, hyperlink 509 may correspond to hyperlink 418, and hyperlink 512 may correspond to hyperlink 421. Each hyperlink may point to a location. For example, hyperlink 503 may point to location 515, hyperlink 506 may point to location 518, hyperlink 509 may point to location 521, and hyperlink 512 may point to location 524. Hyperlinks 500 may direct users to downloadable files, such as PDF documents, images, or software applications. Each location may be a web page, for example, within the same database or on a different domain. Additionally, hyperlinks 500 may lead to specific locations within a web page, such as a particular section or anchor point.

In some embodiments, machine learning subsystem 114 may input the search query and the hyperlinks into a machine learning model (e.g., machine learning model 202, as shown in FIG. 2). The machine learning model may be the model previously trained to predict relevance of hyperlinks to search queries. In some embodiments, inputting the search query and the hyperlinks into the machine learning model may cause the machine learning model to generate predictions of the relevance of the hyperlinks to the search query. In some embodiments, the machine learning model may output predictions on a scale of zero to one (e.g., where zero represents no relevance and one represents complete relevance), zero to one hundred percent (e.g., where zero percent represents no relevance and one hundred percent represents complete relevance), or in another format. The machine learning model may predict relevance based on the type of location specified by each hyperlink. A first hyperlink specifying a first type of location may have a lower relevance than a second hyperlink specifying a second type of location. As an illustrative example, hyperlink 412, as shown in FIG. 4, may initiate a download of a Word document. This type of location may be associated with a high relevance. However, the user entering the search query may lack proper authorization to view the document, and thus, the resource may not be provided to the user despite its relevance. Hyperlink 415 may link to a web page, which may have a high relevance but a lower relevance than a document download. Hyperlink 418 may link to a video conferencing platform, which has a low relevance. Hyperlink 421 may link to a PDF document, which has a high relevance.

In some embodiments, relevance prediction system 102 (e.g., scoring subsystem 118) may determine an overall relevance score for each resource in relation to the search query based on each prediction of relevance. For example, the relevance score may be a score out of one, out of one hundred percent, out of ten, or out of some other number. In some embodiments, the relevance score may be a category (e.g., high, medium, low). In some embodiments, scoring subsystem 118 may calculate the relevance score in another format. In some embodiments, the overall relevance score may be based on each prediction of relevance as well as one or more additional factors.

As an example, scoring subsystem 118 may calculate the relevance score for each resource based on the other text (e.g., aside from the hyperlink) of each message in addition to the predictions generated by the machine learning model. As an illustrative example, scoring subsystem 118 may determine the relevance score for message 403, as shown in FIG. 4, based on the prediction generated by the machine learning model, the text of message 403 (e.g., "revised policy"), and the text of the hyperlink itself (e.g., "travel_insurane_policy.docx"). Scoring subsystem 118 may assign a relevance score (e.g., 90%) to message 403 based on a combination of these factors.

In some embodiments, scoring subsystem 118 may base the overall relevance score in part on connected messages (e.g., replies). For example, scoring subsystem 118 may determine the relevance score for message 406-a based on predictions generated by the machine learning model, the text of message 406-a, and the text of message 406-b (e.g., a message reply to message 406-a). In some embodiments, the text of message 406-b may include certain keywords that scoring subsystem 118 may use to assign the relevance score to message 406-a. For example, scoring subsystem 118 may identify keywords indicating resolution and may base the relevance score in part on the keywords indicating gratitude, resolution, or conclusion. In some embodiments, this may involve performing sentiment analysis on the text of the resources. Message 406-b includes, "This is great, thank you!" Both "this is great" and "thank you" indicate gratitude and resolution. Scoring subsystem 118 may increase the relevance score for message 406-a based on the keywords indicating gratitude and resolution in message 406-a. Scoring subsystem 118 may assign a relevance score (e.g., 40%) to message 406-a based on a combination of these factors.

In some embodiments, scoring subsystem 118 may determine the relevance score for message 409, as shown in FIG. 4, based on the prediction generated by the machine learning model, the text of message 409 (e.g., "revised policy"), and types of locations linked by hyperlink 418 and hyperlink 421 (e.g., a video conferencing platform and a PDF document, respectively). Scoring subsystem 118 may assign a relevance score (e.g., 90%) to message 403 based on a combination of these factors.

In some embodiments, to determine the overall relevance score, scoring subsystem 118 may calculate subjectivity scores for the resources. In some embodiments, the subjectivity score may be based on a type of resource. For example, a first type of resource (e.g., an email including advice on insurance companies) may have a lower subjectivity than a second type of resource (e.g., a memo explaining policy terms in a travel insurance policy). Scoring subsystem 118 may then determine the overall relevance score based on the predictions of relevance generated by the machine learning model and the subjectivity scores.

In some embodiments, to calculate the overall relevance score, scoring subsystem 118 may classify the search query into a first category of a number of categories. For example, categories may include reimbursement requests, policy questions, purchase issues, and other categories. Scoring subsystem 118 may categorize the search query in a first category (e.g., reimbursement requests). Scoring subsystem 118 may then categorize the resources into the categories. Scoring subsystem 118 may then determine relatedness scores for the resources, where a first resource belonging to the first category (e.g., the same category as the search query) has a higher relatedness score than a second resource belonging to a different category. Scoring subsystem 118 may then determine the overall relevance score based on the predictions of relevance generated by the machine learning model and the relatedness scores.

In some embodiments, scoring subsystem 118 may rely on other information to calculate the overall relevance scores. For example, polarity scores may identify an overall mood of a message (e.g., satisfied, dissatisfied, confused, etc.). Scoring subsystem 118 may take into account emojis within the messages (e.g., emojis may convey satisfaction, dissatisfaction, resolution, gratitude, or other sentiments).

Scoring subsystem 118 may rely on these and other factors in combination with the predictions of relevance generated by the machine learning model. When calculating the overall relevance score, scoring subsystem 118 may combine various scores discussed herein. For example, scoring subsystem 118 may take into account the predictions of relevance generated by the machine learning model, sentiment analyses, relatedness analyses, polarity analyses, other context within the resources, and other scores. Scoring subsystem 118 may assign a score or rating for each analysis. In some embodiments, scoring subsystem 118 may calculate the overall relevance score by calculating an average, a weighted average, or another combined score.

In some embodiments, once scoring subsystem 118 has calculated the overall relevance score for each resource, communication subsystem 112 may output (e.g., via the search system) certain resources. For example, communication subsystem 112 may output resources having a relevance score above a certain threshold. For example, scoring subsystem 118 may determine that the overall relevance score satisfies a relevance threshold, and based on determining that the overall relevance score satisfies the relevance threshold, communication subsystem 112 may output the resources to the user. In some embodiments, scoring subsystem 118 may determine that the overall relevance score does not satisfy a relevance threshold, and in response, communication subsystem 112 may output only a subset of the plurality of resources to the user. For example, the subset may include messages for which corresponding hyperlinks are associated with relevance predictions that satisfy the relevance threshold. In some embodiments, communication subsystem 112 may output resources that have not been deemed unavailable (e.g., due to inadequate permissions). In some embodiments, communication subsystem 112 may rank resources according to their relevance scores (e.g., in decreasing order). In some embodiments, communication subsystem 112 may output the resources or a subset of the resources according to other criteria.

Figure 6:
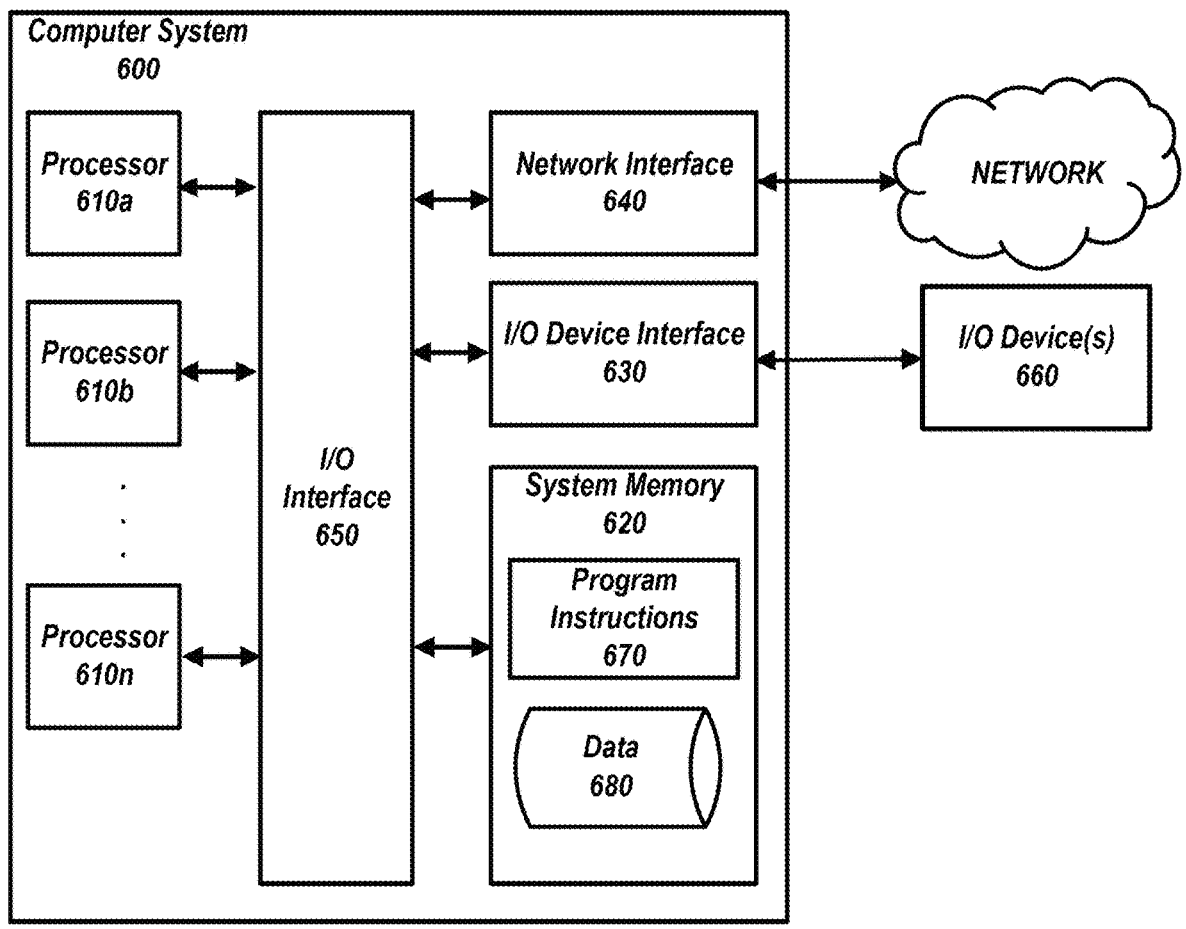
FIG. 6 illustrates a computing device, in accordance with one or more embodiments.

FIG. 6 shows an example computing system 600 that may be used in accordance with some embodiments of this disclosure. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610a-610n) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610a), or a multi-processor system including any number of suitable processors (e.g., 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and an apparatus can also be implemented as, special purpose logic circuitry, for example., an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computing system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computing system 600 through a wired or wireless connection. I/O devices 660 may be connected to computing system 600 from a remote location. I/O devices 660 located on remote computer systems, for example, may be connected to computing system 600 via a network and network interface 640.

Network interface 640 may include a network adapter that provides for connection of computing system 600 to a network. Network interface 640 may facilitate data exchange between computing system 600 and other devices connected to the network. Network interface 640 may support wired or wireless communication. The network may include an electronic communication network, such as the Internet, an LAN, a WAN, a cellular communications network, or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. A non-transitory computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 620 may include a non-transitory computer-readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 600, or multiple computer systems 600 configured to host different portions or instances of embodiments. Multiple computer systems 600 may provide for parallel or sequential processing/execution of one or more portions of the techniques described herein.

Those skilled in the art will appreciate that computing system 600 is merely illustrative and is not intended to limit the scope of the techniques described herein. Computing system 600 may include any combination of devices or software that may perform or otherwise provide for the performance of the techniques described herein. For example, computing system 600 may include or be a combination of a cloud-computing system, a data center, a server rack, a server, a virtual server, a desktop computer, a laptop computer, a tablet computer, a server device, a user device, a mobile telephone, a personal digital assistant (PDA), a mobile audio or video player, a game console, a vehicle-mounted computer, a GPS, or the like. Computing system 600 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

FIG. 7 shows a flowchart of the process 700 for predicting relevance of resources to search queries, in accordance with one or more embodiments. For example, the system may use process 700 (e.g., as implemented on one or more system components described above) to determine which resources are relevant to search queries based on the types of locations linked to the resources by hyperlink.

At 702, relevance prediction system 102 (e.g., using one or more of processors 610a-610n) may receive training hyperlinks specifying locations within a database. In some embodiments, relevance prediction system 102 (e.g., communication subsystem 112) may receive the training hyperlinks from data 680.

At 704, relevance prediction system 102 (e.g., using one or more of processors 610a-610n) may input the training hyperlinks into a model. In some embodiments, relevance prediction system 102 may additionally input training queries into the machine learning model. In some embodiments, this may train the model to predict relevance of the training hyperlinks to the training queries. In some embodiments, relevance prediction system 102 (e.g., machine learning subsystem 114) may input the training hyperlinks and training queries into the machine learning model using one or more of processors 610a-610n.

At 706, relevance prediction system 102 (e.g., using one or more of processors 610a-610n) may receive a search query requesting resources from the database. In some embodiments, relevance prediction system 102 (e.g., communication subsystem 112) may receive the search query from I/O devices 660 via the network.

At 708, relevance prediction system 102 (e.g., using one or more of processors 610a-610n) may identify resources relating to the search query. For example, relevance prediction system 102 may identify stored messages relating to the search query. In some embodiments, relevance prediction system 102 (e.g., resource identification subsystem 116) may identify the resources using data 680 and one or more of processors 610a-610n.

At 710, relevance prediction system 102 (e.g., using one or more of processors 610a-610n) may extract hyperlinks specifying locations within the database. In some embodiments, relevance prediction system 102 (e.g., resource identification subsystem 116) may extract the hyperlinks using one or more of processors 610a-610n.

At 712, relevance prediction system 102 (e.g., using one or more of processors 610a-610n) may input the search query and the hyperlinks into the model to cause the model to generate predictions of the relevance of the hyperlinks to the search query. In some embodiments, relevance prediction system 102 (e.g., machine learning subsystem 114) may input the search query and the hyperlinks into the model using one or more of processors 610a-610n.

At 714, relevance prediction system 102 (e.g., using one or more of processors 610a-610n) may determine an overall relevance score for the resources in relation to the search query based on the predictions of relevance. In some embodiments, relevance prediction system 102 (e.g., scoring subsystem 118) may determine the overall relevance score using one or more of processors 610a-610n.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising retrieving, from a plurality of messages stored within a database, a plurality of training hyperlinks specifying a plurality of locations within the database, inputting, into a machine learning model, the plurality of training hyperlinks and a plurality of training queries to train the machine learning model to predict relevance of the plurality of training hyperlinks to the plurality of training queries based on types of locations specified by the plurality of training hyperlinks, wherein a first training hyperlink specifying a first type of location has a lower relevance than a second training hyperlink specifying a second type of location, receiving, from a user, a search query requesting resources from the database, identifying, within the database, a plurality of resources relating to the search query, wherein the plurality of resources comprises one or more messages, extracting, from the one or more messages, one or more hyperlinks specifying one or more locations within the database, inputting, into the machine learning model, the search query and the one or more hyperlinks to cause the machine learning model to generate one or more predictions of the relevance of the one or more hyperlinks to the search query based on a type of location specified by each hyperlink, wherein a first hyperlink specifying the first type of location has a lower relevance than a second hyperlink specifying the second type of location, and determining an overall relevance score for the plurality of resources in relation to the search query based on the one or more predictions of relevance.

2. A method comprising retrieving, from a plurality of messages stored within a database, a plurality of training hyperlinks specifying a plurality of locations within the database, inputting, into a machine learning model, the plurality of training hyperlinks and a plurality of training queries to train the machine learning model to predict relevance of the plurality of training hyperlinks to the plurality of training queries, receiving, from a user, a search query requesting resources from the database, identifying, within the database, a plurality of resources relating to the search query, wherein the plurality of resources comprises one or more messages, extracting, from the one or more messages, one or more hyperlinks specifying one or more locations within the database, inputting, into the machine learning model, the search query and the one or more hyperlinks to cause the machine learning model to generate one or more predictions of the relevance of the one or more hyperlinks to the search query, and determining an overall relevance score for the plurality of resources in relation to the search query based on the one or more predictions of relevance.

3. A method comprising receiving, from a user, a search query requesting resources from a database, identifying, within the database, a plurality of resources relating to the search query, wherein the plurality of resources comprises one or more messages, extracting, from the one or more messages, one or more hyperlinks specifying one or more locations within the database, inputting, into a machine learning model, the search query and the one or more hyperlinks to cause the machine learning model to generate one or more predictions of relevance of the one or more hyperlinks to the search query, wherein the machine learning model is trained to predict the relevance of hyperlinks to queries, and determining an overall relevance score for the plurality of resources in relation to the search query based on the one or more predictions of relevance.

4. The method of any one of the preceding embodiments, wherein training the machine learning model to predict the relevance of the plurality of training hyperlinks to the plurality of training queries further comprises: training the machine learning model to predict the relevance of the plurality of training hyperlinks to the plurality of training queries based on types of locations specified by the plurality of training hyperlinks, wherein a first training hyperlink specifying a first type of location has a lower relevance than a second training hyperlink specifying a second type of location.

5. The method of any one of the preceding embodiments, wherein the first type of location comprises a video meeting platform and the second type of location comprises a document viewing platform.

6. The method of any one of the preceding embodiments, wherein causing the machine learning model to generate one or more predictions of the relevance of the one or more hyperlinks to the search query comprises causing the machine learning model to generate the one or more predictions based on a type of location specified by each hyperlink, wherein a first hyperlink specifying the first type of location has a lower relevance than a second hyperlink specifying the second type of location.

7. The method of any one of the preceding embodiments, wherein determining the overall relevance score further comprises: classifying the search query into a first category of a plurality of categories, classifying the plurality of resources into one or more categories of the plurality of categories, determining a plurality of relatedness scores for the plurality of resources, wherein a first resource belonging to the first category has a higher relatedness score than a second resource belonging to a different category of the plurality of categories, and determining the overall relevance score based on the one or more predictions of relevance and the plurality of relatedness scores.

8. The method of any one of the preceding embodiments, wherein determining the overall relevance score further comprises: identifying, within the one or more messages, one or more keywords, and determining the overall relevance score based on the one or more predictions of relevance and the one or more keywords indicating resolution.

9. The method of any one of the preceding embodiments, wherein the one or more keywords comprise one or more indications of gratitude, resolution, and conclusion.

10. The method of any one of the preceding embodiments, further comprising: determining that the overall relevance score satisfies a relevance threshold, and based on determining that the overall relevance score satisfies the relevance threshold, outputting the plurality of resources to the user.

11. The method of any one of the preceding embodiments, further comprising: determining that the overall relevance score does not satisfy a relevance threshold, and based on determining that the overall relevance score does not satisfy the relevance threshold, outputting a subset of the plurality of resources to the user, wherein the subset comprises a subset of the one or more messages for which corresponding hyperlinks are associated with predictions of the relevance that satisfy the relevance threshold.

12. One or more tangible, non-transitory, computer-readable media storing instructions that, when executed by a data processing apparatus, cause the data processing apparatus to perform operations comprising those of any of embodiments 1-11.

13. A system comprising one or more processors and memory storing instructions that, when executed by the processors, cause the processors to effectuate operations comprising those of any of embodiments 1-11.

14. A system comprising means for performing any of embodiments 1-11.

15. A system comprising cloud-based circuitry for performing any of embodiments 1-11.

What is claimed is:

1. A system for predicting relevance of resources to search queries, the system comprising:
one or more processors; and
one or more non-transitory, computer-readable media having computer-executable instructions stored thereon that, when executed by the one or more processors, cause the system to perform operations comprising:

retrieving, from a plurality of messages stored within a database, a plurality of training hyperlinks specifying a plurality of locations within the database;
inputting, into a machine learning model, the plurality of training hyperlinks and a plurality of training queries to train the machine learning model to predict relevance of the plurality of training hyperlinks to the plurality of training queries based on types of locations specified by the plurality of training hyperlinks, wherein a first training hyperlink specifying a first type of location has a lower relevance than a second training hyperlink specifying a second type of location;
receiving, from a user, a search query requesting resources from the database;
identifying, within the database, a plurality of resources relating to the search query, wherein the plurality of resources comprises one or more messages;
extracting, from the one or more messages, one or more hyperlinks specifying one or more locations within the database;
inputting, into the machine learning model, the search query and the one or more hyperlinks to cause the machine learning model to generate one or more predictions of the relevance of the one or more hyperlinks to the search query based on a type of location specified by each hyperlink, wherein a first hyperlink specifying the first type of location has a lower relevance than a second hyperlink specifying the second type of location; and
determining an overall relevance score for the plurality of resources in relation to the search query based on the one or more predictions of relevance.

2. A method comprising:
retrieving, from a plurality of messages stored within a database, a plurality of training hyperlinks specifying a plurality of locations within the database;
inputting, into a machine learning model, the plurality of training hyperlinks and a plurality of training queries to train the machine learning model to predict relevance of the plurality of training hyperlinks to the plurality of training queries;
receiving, from a user, a search query requesting resources from the database;
identifying, within the database, a plurality of resources relating to the search query, wherein the plurality of resources comprises one or more messages;
extracting, from the one or more messages, one or more hyperlinks specifying one or more locations within the database;
inputting, into the machine learning model, the search query and the one or more hyperlinks to cause the machine learning model to generate one or more predictions of the relevance of the one or more hyperlinks to the search query; and
determining an overall relevance score for the plurality of resources in relation to the search query based on the one or more predictions of relevance.

3. The method of claim 2, wherein training the machine learning model to predict the relevance of the plurality of training hyperlinks to the plurality of training queries further comprises:
training the machine learning model to predict the relevance of the plurality of training hyperlinks to the plurality of training queries based on types of locations specified by the plurality of training hyperlinks, wherein a first training hyperlink specifying a first type of location has a lower relevance than a second training hyperlink specifying a second type of location.

4. The method of claim 3, wherein the first type of location comprises a video meeting platform and the second type of location comprises a document viewing platform.

5. The method of claim 3, wherein causing the machine learning model to generate one or more predictions of the relevance of the one or more hyperlinks to the search query comprises causing the machine learning model to generate the one or more predictions based on a type of location specified by each hyperlink, wherein a first hyperlink specifying the first type of location has a lower relevance than a second hyperlink specifying the second type of location.

6. The method of claim 2, wherein determining the overall relevance score further comprises:
 determining a plurality of subjectivity scores for the plurality of resources, wherein a first type of resource has a lower subjectivity than a second type of resource; and
 determining the overall relevance score based on the one or more predictions of relevance and the plurality of subjectivity scores.

7. The method of claim 2, wherein determining the overall relevance score further comprises:
 classifying the search query into a first category of a plurality of categories;
 classifying the plurality of resources into one or more categories of the plurality of categories;
 determining a plurality of relatedness scores for the plurality of resources, wherein a first resource belonging to the first category has a higher relatedness score than a second resource belonging to a different category of the plurality of categories; and
 determining the overall relevance score based on the one or more predictions of relevance and the plurality of relatedness scores.

8. The method of claim 2, wherein determining the overall relevance score further comprises:
 identifying, within the one or more messages, one or more keywords; and
 determining the overall relevance score based on the one or more predictions of relevance and the one or more keywords indicating resolution.

9. The method of claim 8, wherein the one or more keywords comprise one or more indications of gratitude, resolution, and conclusion.

10. The method of claim 2, further comprising:
 determining that the overall relevance score satisfies a relevance threshold; and
 based on determining that the overall relevance score satisfies the relevance threshold, outputting the plurality of resources to the user.

11. The method of claim 2, further comprising:
 determining that the overall relevance score does not satisfy a relevance threshold; and
 based on determining that the overall relevance score does not satisfy the relevance threshold, outputting a subset of the plurality of resources to the user, wherein the subset comprises a subset of the one or more messages for which corresponding hyperlinks are associated with predictions of the relevance that satisfy the relevance threshold.

12. One or more non-transitory, computer-readable media storing instructions that, when executed by one or more processors, cause operations comprising:
 receiving, from a user, a search query requesting resources from a database;
 identifying, within the database, a plurality of resources relating to the search query, wherein the plurality of resources comprises one or more messages;
 extracting, from the one or more messages, one or more hyperlinks specifying one or more locations within the database;
 inputting, into a machine learning model, the search query and the one or more hyperlinks to cause the machine learning model to generate one or more predictions of relevance of the one or more hyperlinks to the search query, wherein the machine learning model is trained to predict the relevance of hyperlinks to queries; and
 determining an overall relevance score for the plurality of resources in relation to the search query based on the one or more predictions of relevance.

13. The one or more non-transitory, computer-readable media of claim 12, wherein the instructions further cause the one or more processors to perform operations comprising:
 retrieving, from a plurality of messages stored within a database, a plurality of training hyperlinks specifying a plurality of locations within the database; and
 inputting, into the machine learning model, the plurality of training hyperlinks and a plurality of training queries to train the machine learning model to predict relevance of the plurality of training hyperlinks to the plurality of training queries.

14. The one or more non-transitory, computer-readable media of claim 13, wherein the instructions for training the machine learning model to predict the relevance of the plurality of training hyperlinks to the plurality of training queries further cause the one or more processors to perform operations comprising:
 training the machine learning model to predict the relevance of the plurality of training hyperlinks to the plurality of training queries based on types of locations specified by the plurality of training hyperlinks,
 wherein a first training hyperlink specifying a first type of location has a lower relevance than a second training hyperlink specifying a second type of location.

15. The one or more non-transitory, computer-readable media of claim 14, wherein causing the machine learning model to generate one or more predictions of the relevance of the one or more hyperlinks to the search query comprises causing the machine learning model to generate the one or more predictions based on a type of location specified by each hyperlink, wherein a first hyperlink specifying the first type of location has a lower relevance than a second hyperlink specifying the second type of location.

16. The one or more non-transitory, computer-readable media of claim 12, wherein the instructions for determining the overall relevance score further cause the one or more processors to perform operations comprising:
 determining a plurality of subjectivity scores for the plurality of resources, wherein a first type of resource has a lower subjectivity than a second type of resource; and
 determining the overall relevance score based on the one or more predictions of relevance and the plurality of subjectivity scores.

17. The one or more non-transitory, computer-readable media of claim 12, wherein the instructions for determining the overall relevance score further cause the one or more processors to perform operations comprising:
 classifying the search query into a first category of a plurality of categories;

classifying the plurality of resources into one or more categories of the plurality of categories;

determining a plurality of relatedness scores for the plurality of resources, wherein a first resource belonging to the first category has a higher relatedness score than a second resource belonging to a different category of the plurality of categories; and determining the overall relevance score based on the one or more predictions of relevance and the plurality of relatedness scores.

18. The one or more non-transitory, computer-readable media of claim 12, wherein the instructions for determining the overall relevance score further cause the one or more processors to perform operations comprising:

identifying, within the one or more messages, one or more keywords; and determining the overall relevance score based on the one or more predictions of relevance and the one or more keywords indicating resolution.

19. The one or more non-transitory, computer-readable media of claim 12, wherein the instructions further cause the one or more processors to perform operations comprising:

determining that the overall relevance score satisfies a relevance threshold; and based on determining that the overall relevance score satisfies the relevance threshold, outputting the plurality of resources to the user.

20. The one or more non-transitory, computer-readable media of claim 12, wherein the instructions further cause the one or more processors to perform operations comprising:

determining that the overall relevance score does not satisfy a relevance threshold; and based on determining that the overall relevance score does not satisfy the relevance threshold, outputting a subset of the plurality of resources to the user, wherein the subset comprises a subset of the one or more messages for which corresponding hyperlinks are associated with predictions of the relevance that satisfy the relevance threshold.

* * * * *